(12) United States Patent
Verbeke et al.

(10) Patent No.: US 11,009,954 B2
(45) Date of Patent: May 18, 2021

(54) HAPTICS DEVICE FOR PRODUCING DIRECTIONAL SOUND AND HAPTIC SENSATIONS

(71) Applicant: Harman International Industries, Incorporated, Stamford, CT (US)

(72) Inventors: Joseph Verbeke, San Francisco, CA (US); Adam Boulanger, Palo Alto, CA (US); Stefan Marti, Oakland, CA (US); Davide Di Censo, Sunnyvale, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 246 days.

(21) Appl. No.: 15/996,464

(22) Filed: Jun. 2, 2018

(65) Prior Publication Data

US 2019/0369731 A1    Dec. 5, 2019

(51) Int. Cl.
| | |
|---|---|
| *G06F 3/00* | (2006.01) |
| *G06F 3/01* | (2006.01) |
| *G06F 3/16* | (2006.01) |
| *H04R 1/02* | (2006.01) |
| *H04R 1/32* | (2006.01) |

(52) U.S. Cl.
CPC .............. *G06F 3/016* (2013.01); *G06F 3/017* (2013.01); *G06F 3/167* (2013.01); *H04R 1/025* (2013.01); *H04R 1/323* (2013.01)

(58) Field of Classification Search
CPC .... H04R 2400/03; H04R 1/025; H04R 1/323; G06F 3/016; G06F 3/011; G06F 3/017; G06F 1/163
See application file for complete search history.

(56) References Cited

U.S. PATENT DOCUMENTS

| 10,257,637 B2 | 4/2019 | Di Censo et al. |
| 2016/0098095 A1 | 4/2016 | Gonzalez-Banos et al. |

(Continued)

FOREIGN PATENT DOCUMENTS

| WO | 02/27705 A1 | 4/2002 |
| WO | 03/032538 A2 | 4/2003 |

OTHER PUBLICATIONS

Berktay, H.O., "Possible Exploitation of Non-Linear Acoustics in under-water Transmitting Applications", J. Sound Vib. vol. 2, No. 4, 1965, pp. 435-461.

(Continued)

*Primary Examiner* — Matthew A Eason
(74) *Attorney, Agent, or Firm* — Artegis Law Group, LLP (57) ABSTRACT

One embodiment of the present disclosure sets forth a technique for delivering audio output and generates haptic sensations on or proximate to objects in an environment via which a user can perceive haptic sensations. The device includes transducer arrays that operate in various modalities, including generating audio output, generating haptic output, and sensing objects in the environment. When generating audio output, the transducer arrays produce ultrasonic waves that demodulate to produce audio output. When generating haptic output, the transducer arrays output directional haptic output to various locations to the environment using constructive and/or destructive interference. When sensing objects in the environment, the transducer arrays generate pings and detect ping echoes reflected off of objects in the environment.

20 Claims, 5 Drawing Sheets

(56) References Cited

U.S. PATENT DOCUMENTS

2016/0184703 A1\* 6/2016 Brav .................. A63F 13/5378
463/30
2019/0227631 A1 7/2019 Marti et al.

OTHER PUBLICATIONS

Gavrilov et al., "A Study of Reception with the Use of Focused Ultrasound. I. Effects on the Skin and Deep Receptor Structures in Man", Brain Research, vol. 135, No. 2, 1977, pp. 265-277.
Extended European Search Report for application No. 19176855.5 dated Jun. 28, 2019.

\* cited by examiner

HAPTICS DEVICE FOR PRODUCING DIRECTIONAL SOUND AND HAPTIC SENSATIONS

BACKGROUND

Field of the Embodiments of the Disclosure

Embodiments of the present disclosure relate generally to audio systems and, more specifically, to a haptics device for producing directional sound and haptic sensations.

DESCRIPTION OF THE RELATED ART

Many consumer electronics devices, such as smartphones, media players, tablets, and personal computers, present various forms of media content to users. For example, a consumer electronics device may present visual content to a user via a display, while relying on headphones, built-in speakers, and/or external speakers (e.g., compact, portable speakers) to produce audio content for the user. In particular, headphones deliver audio directly to the ears of a user, while speakers produce surround sound that delivers audio content throughout a large area.

Using either headphones or speakers to present audio content to a user presents multiple drawbacks. In particular, although headphones are capable of providing a high-fidelity audio experience, the form factor of headphones can cause sounds from the user's environment to be blocked from entering the user's ear canal. Accordingly, wearing headphones may isolate the user from important sounds within her environment, thereby reducing the user's ability to interact with her environment effectively. On the other hand, although an external speaker system enables a user to listen to audio content without experience auditory isolated, sound emanating from such a system may be audible to persons around the user. Accordingly, the use of external speakers may be disturbing in various situations.

Furthermore, consumer electronics devices that produce visual content often require users to visually focus on a display in order to receive the visual content. For example, a consumer electronics device may download notifications relating to a user's environment from a networked database. The consumer electronics device may further generate visual content based on the notification and transmit the visual content to the user via the display.

One drawback of these types of consumer electronics devices is that a user who is not visually focusing on the display may be unaware that a new notification is being displayed by the consumer electronics device. Accordingly, the user may remain uninformed about the notification for extended periods of time. Alternatively, when the user is visually focusing on the display, the user may be unaware of events occurring in the local environment. Thus, the visual content presented to the user may distract the user from interacting effectively with the local environment.

One proposed solution to the above drawbacks is to provide an audio notification to a user when a visual notification is displayed. However, in addition to the above presented disadvantages of headphones and speakers, providing audio notifications via these types of devices may disrupt audio content that is concurrently being presenting by the headphones and/or speakers. Accordingly, conventional approaches for presenting visual content and audio content from a consumer electronics device to a user may distract a user from interacting effectively with the surrounding environment.

As the foregoing illustrates, techniques that present media content to a user more effectively would be useful.

SUMMARY

One embodiment of the present disclosure sets forth a system for providing audio content and haptic sensations to a user. The system includes a plurality of transducers and a processor coupled to the one or more transducers and configured to receive a sound tone and a haptic sensation to deliver to a user, select a first location at which to deliver audio output corresponding to the sound tone and a second location to which to deliver haptic output corresponding to the haptic sensation, configure a first set of transducers to deliver the audio output to the first location, and configure a second set of transducers to generate the haptic output for delivery to the second location.

Further embodiments provide, among other things, a method and a non-transitory computer-readable medium configured to implement the system set forth above.

At least one advantage of the disclosed techniques is that audio can be transmitted directly to the ears of a user, enabling the user to listen to audio content (e.g., music, voice conversations, notifications, etc.) without disturbing sound-sensitive objects around him or her. Additionally, because the device may be shoulder-mounted, the system does not isolate the user from sounds in his or her environment. Further, the device may interact with a user by generating haptic sensations on and/or proximate to the user. Accordingly, the device may generate haptic sensations that provide indicates to the user (e.g., indicating the location of virtual objects in space).

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the embodiments of the present disclosure. However, it will be apparent to one of skill in the art that the embodiments of the present disclosure may be practiced without one or more of these specific details.

Figure 1:
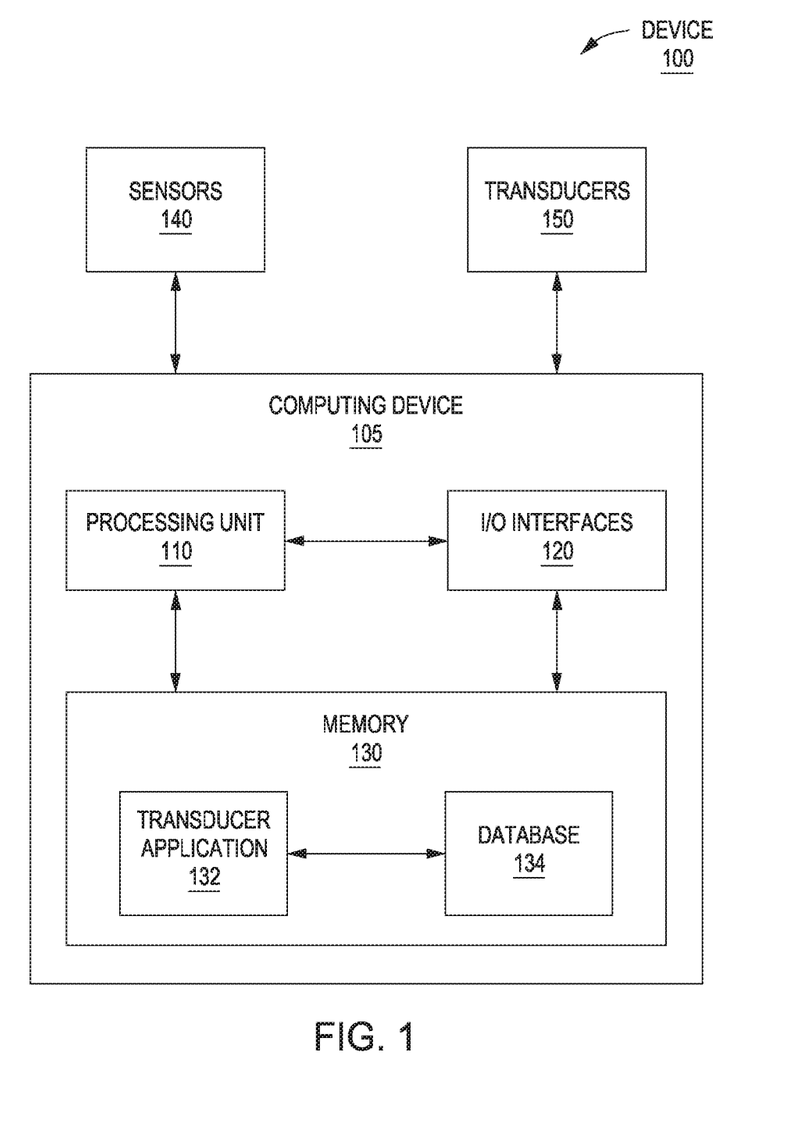
FIG. 1 illustrates a block diagram of a device configured to implement one or more aspects of the present disclosure, according to various embodiments.

FIG. 1 illustrates a block diagram of a device 100 configured to implement one or more aspects of the present disclosure, according to various embodiments. As shown, device 100 includes, without limitation, sensors 140, transducers 150, and computing device 105. Device 100 may be implemented as a mobile device, a wearable device, and/or may be implemented within an external device, such as a vehicle, a home entertainment system, and so forth. For example, device 100 may be integrated into a neck and/or shoulder worn devices. Additionally or alternatively, device 100 may be integrated into a user's clothing (e.g., a shirt, a jacket, a sweater, etc.). Device 100 may also include a hook or attachment piece that facilitates device 100 to be attached to a user's clothing. The attachment piece may include Velcro®, an adhesive, and so forth.

Sensors 140 include devices capable of detecting the position of objects in an environment. Sensors 140 may include, without limitation, one or more of RGB imagers and cameras, depth sensors, acoustic and ultrasonic sensors, laser and thermal based sensors, infrared sensors, and structured light cameras with projection units that direct structured light to a target (e.g., a body part of a user). In some embodiments, transducers 150 may operate as a sensor 140, as described in further detail below. In particular, in such embodiments, sensors 140 may include transducer devices, such as ultrasound transducers.

In operation, sensors 140 may generate sensor data reflective of the location of an object in the environment. The object may include various body parts of a user. In particular, the object may include an ear, a face, a chin, a temple, a neck, a shoulder, etc. The object may also include a hand, a finger, a palm, a forearm, an elbow, and arm, a leg, a foot, a calf, a torso, a back, and so forth. Sensors 140 may be positioned so that a user's ear is within a field-of-view of one or more of sensors 140. Similarly, a second set of sensors may be positioned so that a second body part (e.g., a hand) is also within a field-of-view of sensors 140. Accordingly, sensors 140 may be positioned to track the position of multiple objects in an environment. In particular, in some embodiments, sensors 140 may be positioned on a body worn object, such as a neck or shoulder worn device. Additionally or alternatively, sensors may be located on a fixed surface, such as a wall, a ceiling, a floor, and/or other fixed locations in an environment that facilitate sensors 140 to track the locations of objects in the environment.

In additional embodiments, sensors 140 may also track a position of an object by tracking the position of a companion object. For example, when tracking the position of a body part, sensors 140 may track the position of an object associated with the body part, such as a ring, a thimble, a glove, an effector, and so forth. Furthermore, sensors 140 may include devices that implement time-of-flight measurements to determine a distance to an object within the environment. In particular, sensors 140 may include capacitive sensors and receivers operating in a shunt mode or a transmit mode. In addition, sensors 140 may include generator devices that generate electromagnetic transmissions and/or receiver devices that detect electromagnetic transmissions reflecting off of objects in the environment. Receiver devices may include coils that generate an electric field and/or a magnetic field in response to receiving a reflected electromagnetic transmission. In some embodiments, two or more receiver coils may be oriented orthogonally and used in conjunction in order to provide directional information with respect to a position of a detected object. In further embodiments, acoustic devices may be implemented to detect objects located in an environment. These acoustic devices may include speaker devices that output sound and microphone devices that detect sound reflected off of objects in the environment.

In addition, device 100 includes transducers 150 include one or more types of devices that can detect and generate one or more types of waves (e.g., mechanical waves, electromagnetic waves, etc.). For example, transducers 150 could include transducer devices, such as ultrasonic transducer array, that generate and detect ultrasonic waves. In operation, transducers 150 generate waves (e.g., continuous waves, wave pulses, pings etc.) that can be used to determine the location of objects in the environment. The generated waves travel into the environment and reflect off of objects in the environment. Transducers 150 detect reflected waves and transmit signals to processing unit 110, via I/O interfaces 120, that indicate that a wave was detected and may further indicate one or more characteristics of the wave. In addition, transducers 150 emit waves in order to generate a haptic sensation on an object. In one embodiment, transducers 150 generate continuous waves that generate a haptic sensation on a user.

In one embodiment, two or more of transducers 150 are attached to a sleeve or jacket of the user separately from one another. Thus, the relative position of such transducers 150 to each other can change dynamically. In such a case, the locations of each of the two or more transducers 150 in three-dimensional space are tracked separately. In one embodiment, a location tracking sensor, e.g., a sensor 140, tracks the location of each transducers. In such an embodiment, the sensor may track infrared reflective markers placed on a transducer 150 and/or the sensor may track the location of a transducer using ultrasonic tracking. In alternative embodiments, the transducers 150 may include a location sensing sensor such that the transducer can self-localize with regards to a reference point, such as a user or another transducer 150. In such an embodiment, the position sensing sensor may be an accelerometer that can derive location from an acceleration.

With respect to generating waves for determining the location of an object, transducers 150 generate a wave pulse (referred to herein as a "ping") with a particular waveform, frequency, and amplitude. In some embodiments, transducers 150 generate a ping with increasing or decreasing frequency. For example, an ultrasonic transducer included in transducers 150 could modulate the frequency of ultrasonic waves being generated in order to generate a ping with an increasing frequency. In addition, a ping could have intervals of increasing and decreasing frequency and/or amplitude.

In addition to generating pings, transducers 150 detect various types of waves that are incident on transducers 150. Transducers 150 convert the detected waves into an electrical signal that is transmitted to processing unit 110. The electrical signal indicates that a wave has been detected. The electrical signal may further indicate one or more characteristics of the wave, including the waveform, the frequency, the phase, and the amplitude of the wave. For example, transducers 150 could detect ultrasonic waves that have reflected off of a target and have traveled towards transducers 150. In one embodiment, transducers 150 detect ping echoes of pings that have reflected off of an object in the environment.

With respect to generating a haptic sensation on a user, transducers 150 generate various types of haptic output, including continuous waves. For example, transducers 150 could include ultrasonic transducers included in ultrasonic transducer array that generate ultrasonic waves. Transducers 150 may be configured to generate waves that travel towards a particular part of a user, including his or her hand, leg, forearm, wrist, palm, neck, trunk, etc. When an ultrasonic wave interacts with a user's skin, the person may feel a haptic sensation. In some embodiments, transducers 150 generate a particular type of haptic sensation that may indicate to a user that he or she should take a particular action. For example, the haptic sensation could move in a certain direction on the user's body, thereby indicating to the user that she should move in the specified direction. Transducers 150 may further generate a haptic sensation with a particular size, shape, orientation, and/or intensity.

In additional embodiments, transducers 150 may generate audio output. In particular, transducers 150 may generate ultrasonic waves that demodulate to produce highly directional audio output. For example, sound may be produced by performing frequency and/or amplitude modulation of ultrasonic waves produced by transducers 150. In various embodiments, transducers 150 can project a narrow beam of modulated ultrasonic waves that are powerful enough to substantially alter the speed of sound in the air proximate to the narrow beam. In particular, the air within the beam behaves nonlinearly and extracts the modulation signal from the ultrasound, resulting in audible sound that can be heard along the path of the beam and/or that appears to radiate from any surface that the beam strikes. This technology allows a beam of sound to be projected over a long distance and to only be audible within a small well-defined area. In particular, listeners outside the path of the beam hear very little or nothing at all. Accordingly, audio output may be directed to the ears of a user to provide a private audio experience.

Computing device 105 includes, without limitation, processing unit 110, input/output (I/O) interfaces 120, and memory 130. Computing device 105 as a whole may be a microprocessor, an application-specific integrated circuit (ASIC), a system-on-a-chip (SoC) and so forth. In various embodiments, computing device 105 receives data from sensors 140 and/or transducers 150. Furthermore, computing device 105 may transmit control signals and/or data to sensors 140 and transducers 150. In various embodiments, computing device 105 may be implemented as part of an external mobile computing system, such as a smart phone, a tablet, a smart watch, smart eyeglasses, and so forth. Accordingly, computing device 105 may be communicatively coupled with sensors 140 and/or transducers 150 via a wired or wireless connection. In particular, wireless connections may include, for example and without limitation, radio frequency (RF)-based, infrared-based, and/or network-based communication protocols. Additionally or alternatively, computing device 105 may be implemented as part of a cloud-based computing environment. In such embodiments, computing device 105 may be networked with various other elements of device 100, such as sensors 140 and/or transducers 150.

Processing unit 110 may include a central processing unit (CPU), a digital signal processing unit (DSP), a sensor processing unit, a controller unit, and so forth. Processing unit 110 may be physically embedded into device 100, may be part of a cloud-based computing environment, and/or may be physically introduced into device 100 by a user, such as in a mobile or wearable device.

In various embodiments, processing unit 110 is configured to analyze data acquired by sensors 140 and/or transducers 150 to determine attributes of the user, such as the locations, distances, orientations, etc. of the user and the visual features of the user. The determined attributes of the user may be stored in a database 134.

Processing unit 110 generate control signals to modify a frequency, an amplitude, and/or a phase of haptic output and/or audio output from transducers 150 in order to produce a haptic sensation and/or direct an audio signal to an ear of a user.

Processing unit 110 is further configured to compute a vector from a location of a transducer 150 to a position of an ear of the user based on the determined attributes. For example, and without limitation, processing unit 110 may receive data from sensor 140 and/or transducers 150 and process the data to dynamically track the movements of an object such as a head, an ear, a hand, an arm, etc. of the user. Based on changes to the position and orientation of the object, processing unit 110 may compute one or more vectors in order to cause transducers 150 to direct haptic output and/or audio output directly to the object. Processing unit 110 further determines, based on sensor data, various characteristics of objects in the environment of device 100. Characteristics of the objects may include a position, an orientation, a size, a shape, and so forth. In addition, processing unit 110 may also determine a direction in which one or more objects are moving, a velocity of the moving objects, and/or an acceleration of the moving objects. In various embodiments, processing unit 110 is configured to execute applications, such as transducer application 132, included in memory 130. In addition, input/output (I/O) interfaces 120 may include one or more interfaces that coordinate the transfer of data and control signals between sensors 140, transducers 150, and processing unit 110. The data and controls signals may be transmitted and received over a wired connection or wirelessly (e.g., radio frequency, infrared, network connect, etc.).

Memory 130 includes transducer application 132 configured to communicate with database 134. Processing unit 110 executes transducer application 132 to implement the overall functionality of device 100. Memory device 130 may be embedded in an external computing environment and/or may be physically part of device 100. Moreover, memory device 130 may be included in a cloud-based computing environment.

Database 134 may store the types, locations, and orientations of sensors 140 and transducers 150. In addition, for each type of transducer 150, database 134 may store various parameters including an amplitude range and a frequency range of the type of transducer 150, the waveform shapes that can be generated by the type of transducer 150, and various possible device configurations of that type of transducer 150. Similarly, database 134 may store the types of waves, waveforms, frequencies, and amplitudes that each type of device in transducers 150 can detect. Database 134 may also store instructions for configuring transducers 150 to produce haptic sensations, audio output, and to execute sensing functions. In addition, database 134 may store the positions and orientations of transducers 150 as well as user preferences data relating to the types of haptic sensations to generate on the user (e.g., a part of the user on which to generate haptic sensations).

In various embodiments, transducer application 132 coordinates the function of the device 100. In particular, transducer application 132 configures the sensors 140 to generate sensor data reflective of the location of an object in the environment. The object may include a body part of a user, such as a hand, an arm, a neck, an ear, etc.

In various embodiments, transducer application 132 configures sensors 140 to generate sensor data that indicates the presence and/or position of an object in the environment. For example, transducer application 132 configures sensors 140 to detect the location of a body part of a user (e.g., an ear). In particular, transducer application 132 may configure an optical sensor to generate image data of a user's ear. Transducer application 132 may perform a calculation to determine the location of the user's ear relative to the position of the optical sensor. Additionally or alternatively, transducer application 132 may calculate a distance between sensors 140 and the detected object. For example, transducer application 132 may utilize time-of-flight computations to determine a distance between sensors 140 and the detected object.

Furthermore, transducer application 132 may configure sensors 140 to determine the location of, i.e., localize, multiple regions of the detected object. Accordingly, transducer application 132 may control the resolution at which sensors 140 image detected objects. With higher resolution imaging, transducer application 132 may determine a features and characteristics of the detected object, such as a pose of a hand, an orientation of a hand, and separate distances to each finger of a hand. Transducer application 132 may also use the relative distance to a first set of objects in order to localize a second set of objects via triangulation. For example, transducer application 132 may utilize relative distances to an eye, an ear, a nose, and a mouth on a face to localize a position of an ear.

In addition, transducer application 132 may implement one or more machine learning algorithms to generate hand pose estimates. Transducer application 132 may implement machine learning algorithms with one or more learning styles, such as supervised learning, unsupervised learning, and/or semi-supervised learning. Transducer application 132 may acquire training data stored in database 134, and/or may download training data via I/O interfaces 120 from an external data repository, such as a cloud-based data source. In various embodiments, after selecting a machine learning algorithm, transducer application 132 generates a model based on an initial dataset. Transducer application 132 further performs a training step in which the model is trained on a variety of acquired training datasets. For example, in supervised learning, transducer application 132 compares the output of the model to known results. Transducer application 132 further modifies various parameters of the generated model until the output generated by the model matches the known results. In various embodiments, transducer application 132 may modify parameters until the model achieves a threshold success rate.

In various embodiments, the training datasets may include sensor data associated with various objects that is generated by various types of sensors. For example, a training data set may be generated based on image data of different types of human ears generated by a single type of sensor (e.g., an optical sensor) or multiple types of sensors (e.g., an acoustic sensor, a thermal-based sensor, and an infrared-based sensor). Transducer application 132 may select a machine learning algorithm and generate a model based on an initial dataset. Further, as described above, transducer application 132 may train the model to be able to recognize, e.g., derivative geometric features of a distal object, such as a center of mass of a hand, a skeletal structure of a hand, and/or a spherical approximation of a hand. Additionally or alternatively, transducer application 132 may directly calculate derivative geometric features of distal objects from sensor data generated by sensors 140.

In various embodiments, transducer application 132 updates detected attributes of objects as sensors 140 generate sensor data. For example, transducer module 132 may update a distance, a position, an orientation, a size, etc. or a detected object. In some embodiments, transducer application 132 may analyze a time-delineated sequence of characteristics to generate a prediction of a next position of the detected object. Transducer application 132 may utilize one or more machine learning algorithms to model the motion of the detected object. In addition, transducer application 132 may implement a buffer and/or a real-time gesture detection and recognition algorithm to detect a gesture from a time-delineated sequence of characteristics. In various embodiments, transducer application 132 may image the environment proximate to transducers 150 by configuring transducers 150 to generate pings and detect ping echoes reflected from off of objects in the environment. By analyzing ping echoes, transducer application 132 may localize and/or image objects in the environment of device 100.

In operation, transducer application 132 may configure transducers 150 to generate pings with various frequency, amplitude, and waveform characteristics. In some embodiments, transducer application 132 configures at least one of transducers 150 to emit a ping by generating wave pulses having a constant or variable frequency. Further, transducer application 132 configures at least one of transducers 150 to detect ping echoes, for example, the wave pulses that are reflected back to transducers 150 after a ping encounters an object in the environment. Transducer application 132 analyzes ping echoes detected by transducers 150 in order to determine various characteristics of the environment proximate to transducers 150. In particular, transducer application 132 may utilize time-of-flight calculations to localize objects in an environment about device 100. For example, transducer application 132 could associate a ping echo with an emitted ping and further calculate the time interval between transducers 150 emitting the ping and detecting the ping echo (e.g., by comparing the waveforms, frequency patterns, amplitudes, and phase of the detected ping echo to the emitted ping). Based on the calculated time-of-flight and various parameters of the particular ping, transducer application 132 could determine the position of an object in the environment. In particular, transducer application 132 could determine the distance that the ping traveled in the air before being reflected off of an object. In one embodiment, transducer application 132 divides the calculated time-of-flight by twice the speed of the wave associated with the ping in order to determine the distance that the ping traveled before being reflected off of an object. Transducer application 132 may use that distance to determine the location of the object with respect to one or more of transducers 150.

Furthermore, transducer application 132 could identify, by comparing multiple ping-ping echo pairs, the type of object that is proximate to transducers 150. In one embodiment, transducer application 132 utilizes a large number of pings with distinct frequencies and/or frequency patterns in order to image one or more fine structure details of an object. In such an embodiment, upon identifying the location of an object, transducer application 132 may configure transducers 150 to increase the frequency spectrum utilized when generating pings in order to increase the number of unique ping-ping echo pairs. Increasing the number of unique sets of ping-ping echo pairs facilitates transducer application 132 in generating a higher resolution image of the environment. Based on the image, transducer application 132 generates object data that includes the position and characteristics of the objects in the environment detected by analyzing ping echoes. Transducer application 132 may identify the type of object, the orientation of the object, and surface details of the object by analyzing ping echoes. In addition, transducer application 132 may determine other characteristics of the object, such as the manner in which the object is moving in the environment. For example, transducer application 132 could calculate the radial velocity of an object by calculating the Doppler shift between emitted pings and detected ping echoes.

In addition, transducer application 132 coordinates the output of haptic and audio signals from transducers 150. In particular, transducer application may configure transducers 150 to direct haptic output and/or audio output to objects in the environment around device 100. With respect to haptic output, transducer application 132 dynamically selects one or more of transducers 150 to output haptic output with a particular frequency and amplitude. The haptic output produces a haptic surface at a particular location in space. When an object contacts the haptic surface, a haptic sensation may be generated on the object. With respect to audio output, transducer application 132 processes haptic output produces by transducers 150 to produce a narrow band of audio output. The audio output may be directed to an ear of a user to provide private audio for the user.

In operation, transducer application 132 may select a location at which to generate a haptic sensation. Transducer application 132 may access the positions, orientations, and types of transducers 150 in device 100 from database 134. In various embodiments, transducers 150 may include ultrasonic transducers. Ultrasonic transducers may be arranged in arrays (e.g., 4-by-4, 8-by-8, 16-by-16, etc.). Each ultrasonic transducer emits ultrasonic waves of a certain frequency, phase, and intensity. Transducer application 132 configures the ultrasonic transducers in a manner such that haptic output generated by two or more ultrasonic transducers occupy a particular location in space at a particular time. When this occurs, the ultrasonic output of each ultrasonic transducer interferes constructively and/or destructively with the ultrasonic output of one or more other ultrasonic transducers. Transducer application 132 configures ultrasonic transducers such that the constructive and/or destructive interference occurs at the location at which the haptic output reaches the user, thereby generating a specific type of haptic sensation on the user. By modifying the intensity, phase, and frequency of the haptic output of each ultrasonic transducer, transducer application 132 shifts the location of intensity peaks, increases or decreases the number of intensity peaks, and/or adjusts the shape and/or magnitude of one or more intensity peaks. In this manner, transducer application 132 configures ultrasonic transducers and/or transducers 150 in general to generate a specific type of haptic sensation.

In various embodiments, transducer application 132 may configure transducers 150 to generate a haptic sensation proximate to various objects (e.g., a hand). The hand may be located at various positions around device 100, such as in front of device 100, above device 100, beside device 100, etc. Additionally or alternatively, transducer application 132 may configure transducers 150 to generate haptic surfaces at various locations in space, such as beside objects, above objects, below objects, and so forth. For example, device 100 may be integrated in an augmented reality (AR), virtual reality (VR), and/or mixed reality (MR) environment. Transducer application 132 may configure transducers 150 to generate a haptic sensation at positions in the physical environment that match the visually-perceived positions of objects. Accordingly, users may feel haptic sensations when their hands contact and/or intersect regions of the physical environment that correspond to a position of an object in the visually-perceived environment. In one embodiment, the haptic sensations may be sensed by one or more other users in proximity to device 100 but not necessarily in physical contact with device 100.

Additionally or alternatively, transducer application 132 may configure transducers 150 to generate audio output. In operation, transducer application 132 generates audio output by modulating various characteristics of output produced by transducers 150. In particular, transducer application 132 may perform frequency and/or amplitude modulation to configure the transducers 150 to produce modulated ultrasonic waves, which demodulate to produce audio output.

In some embodiments, the audio output may reflect off of objects in the environment, such as a hand. For example, in an AR/VR/MR environment, transducer application 132 may configure transducers 150 to reflect audio output off of a hand of a user to produce an audio event. The audio event may be produced when a user contacts and/or intersects regions of the physical environment that correspond to a position of an object in the visually-perceived environment. In particular, the user may perceive that the audio signal originates from a location of the hand. Alternatively, transducer application 132 may implement one or more transfer functions (e.g., head related transfer functions) to alter the sound produced by the transducers 150 to make sound appear to originate from a selected location in the environment. In particular, the selected location may differ from the location of the transducers 150. In addition, transducer application 132 may configure transducers 150 to deliver audio output directly to a user's ears. In particular, transducer application 132 may analyze sensor data from sensors 140 to track a location of an ear of a user. Based upon the determined location of the ear, transducer application 132 may configure transducers 150 to generate a narrow beam of audio to location of the ear. In various embodiments, transducer application 132 configures transducers 150 to generate audio output that tracks the location of the ear. Accordingly, a user wearing and/or otherwise carrying the device 100 may receive private audio, while dynamically and continuously changing a position of his or her ear and/or a position of the device 100.

In various embodiments, transducer application 132 configures transducers 150 to direct haptic output and/or audio output to various locations and/or to various objects. In particular, transducer application 132 may configure transducers 150 to generate a haptic sensation and/or direct audio output to users who are not wearing and/or carrying the device 100. For example, transducer application 132 may configure transducers 150 to generate a haptic sensation on a hand of an individual who is not the user. Accordingly, device 100 may function as a multi-user device. Further, transducer application 132 may configure transducers 150 to provide private audio to individuals who is not the user thus creating a private communication channel with other via audio demodulating on the ears or through a shared virtual object.

In various embodiments, transducer application 132 may dynamically select a first set of transducers 150 to perform sensing functions, a second set of transducers 150 to generate a haptic sensation, and a third set of transducers 150 to produce audio output. Transducer application 132 may perform the dynamic selection based on various parameters including the number of transducers 150 in device 100, the position and/or orientation of each of transducers 150, the output strength of each of transducers 150. Additionally, transducer application 132 may further perform dynamic selection based on the size, shape, location, and orientation of the haptic sensations for generation, and the location, volume, the frequency range, and the amplitude range of the audio signal for generation. For example, transducer application 132 may configure a first set of transducers 150 that are proximate to a user's shoulders to generate audio output to a user's ear, while a second set of transducers 150 that are located on a user's chest may generate a haptic sensation on a user's hand.

Additionally or alternatively, transducer application 132 may configure transducers 150 to operate in a dedicated mode, where each of transducers 150 performs a single function (e.g., sensing, haptic output generation, and/or audio output generation). Alternatively, transducer application 132 may pre-configure each of transducers 150 to switch between two or more functions at predetermined time intervals. For example, one transducer may perform sensing functions for 10 milliseconds and then switch to generating audio output for 100 milliseconds, while another transducer performs sensing for 20 milliseconds, generates audio output for 50 milliseconds, and then generates haptic output for 50 milliseconds.

In some embodiments, transducer application 132 may configure transducers 150 to simultaneously perform multiple functions. For example, transducer application 132 may configure transducers 150 to detect reflected haptic output and/or audio output that reflects off of objects in the environment. Transducer application 132 may further localize objects based on the detected reflected haptic output and/or audio output. Similarly, in some embodiments, transducer application 132 may configure pairs of transducers 150 to produces haptic output that constructively and destructively interferes. The interference pattern may include regions of haptic output that may be audible and regions of haptic output that may generate a haptic sensation on an object. Accordingly, transducer application 132 may configure pairs of transducers 150 to simultaneously produce haptic output and audio output.

In various embodiments, computing device 105 may be networked with one or more external devices. Computing device 105 may receive wired and/or wireless signals from the external device via I/O interfaces 120. Further, processing unit 110 may execute transducer application 132 to determine a modification to transducers 150. For example, a user may control transducers 150 via a mobile phone, a remote controller, a computer, an augmented reality device, and so forth. Additionally or alternatively, a user may control transducers 150 by generating a gesture. In operation, transducer application 132 may analyze sensor data from sensors 140 to detect gestures performed by a user and/or any objects proximate to device 100. Transducer application 132 may access a look-up table in database 134 to associate the gesture with a modification to apply to the transducers 150. Modifications may include configuring transducers 150 to produce a sound tone, adjust a frequency and/or amplitude of the sound tone, adjust a location of the sound tone and/or a target object to which to direct the sound tone, and so forth. Modifications may further include adjusting a location, intensity, shape, size, and/or pattern of haptic output produced by transducers 150. In addition, modifications may include selecting one or more of an audible sound mode, and a haptic output mode, selecting between multiple audio input streams, such as navigations systems, music, voice-agents services, and so forth. Modifications also may include play/pause functionalities, stop, skip, rewind, and fast forward commands for haptic output and/or audio output.

Figure 2A:
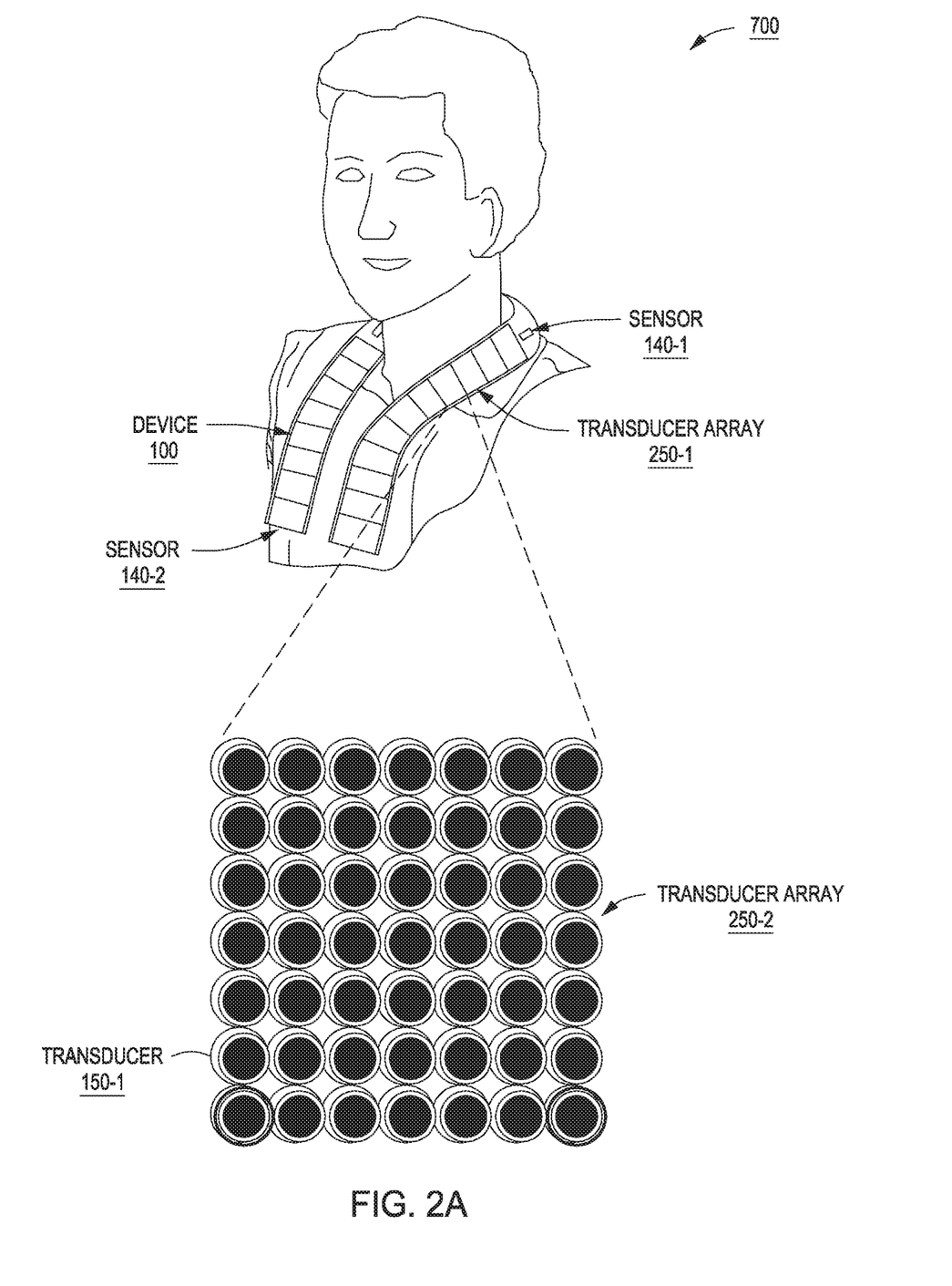
FIGS. 2A-2H illustrate the device of FIG. 1 in various form factors of a wearable device, according to various embodiments.

FIG. 2A illustrates device 100 of FIG. 1 in the form factor of a neck-worn device, according to various embodiments.

As shown, transducers 150 may be arranged as a series of transducer arrays 250. Each transducer array 250 may be located at any given position on device 100. The position of a transducer array 250 impacts the directionality of the haptic and/or audio output emitted from that transducer array 250. For example, transducer array 250-1 may be located at a position on the device 100 that is closest to a head region of a wearer of the device 100. Accordingly, transducer application 132 may configure transducer array 250-1 to produce haptic output and audio output toward objects above the device 100, including, but not limited to, a neck, a face, an ear, a head, and so forth. Sensor 140-1 is also located a position on the device 100 that is closest to a head region of a wearer of the device 100. Accordingly, sensor 140-1 may track the position of objects above device 140, enabling transducer application 132 to configure transducers in transducer array 250-1 to generate haptic output and/or audio output that targets a particular object and/or region in space.

Similarly, transducer array 250-2 may be located on the front face of device 100. Accordingly, transducer application 132 may configure transducer array 250-2 to produce haptic output and audio output toward objects in front of device 100, including, but not limited to, a hand, a wrist, a forearm, and so forth. Sensor 140-2 is also located on the front face of device 100. Accordingly, sensor 140-2 may track the position of objects in front of device 140, enabling transducer application 132 to configure transducers in transducer array 250-2 to generate haptic output and/or audio output that targets a particular object and/or region in space located in front of a user. For example, transducer application 132 may configure transducers in transducer array 250-2 to generate a haptic sensation proximate to a hand of a user. In addition, transducer application 132 may configure transducers in transducer array 250-2 to target people close by but not necessarily in physical contact with device 100. For example, transducer application 132 may configure transducers in transducer array 250-2 to generate a haptic sensation proximate to the hand of another person in proximity. The location of the haptic sensation may correspond to a location of an object being viewed by the user in a VR/AR/MR environment.

Figure 2B:
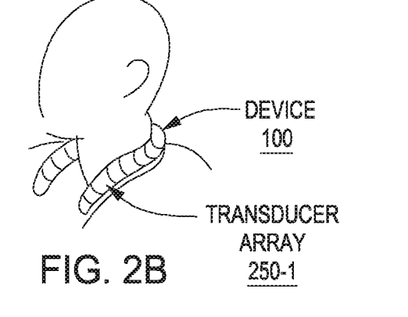
Figure 2C:
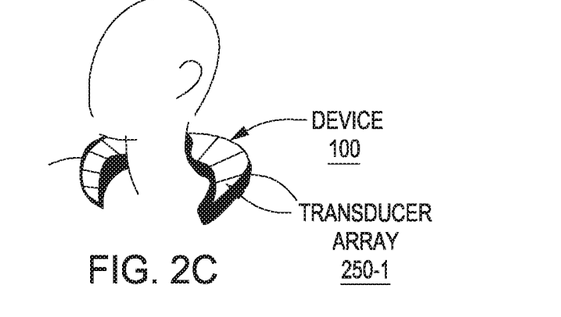
Figure 2D:
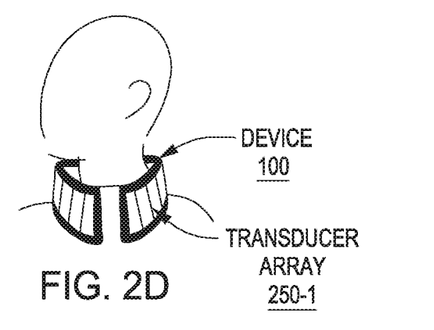
Figure 2E:
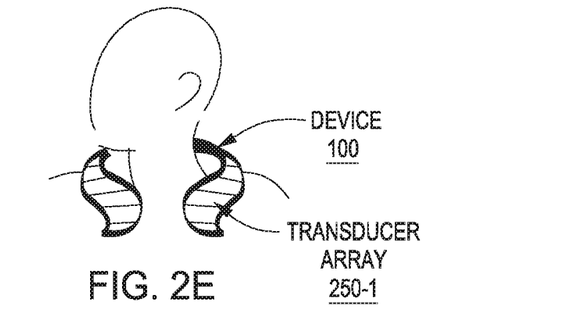
Figure 2F:
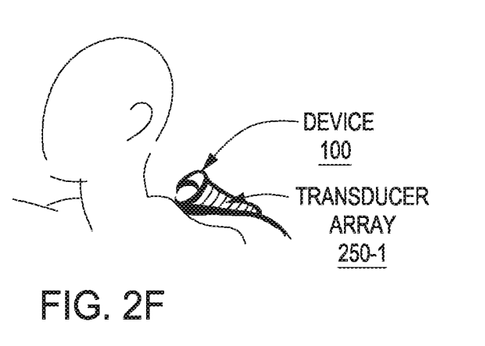
Figure 2G:
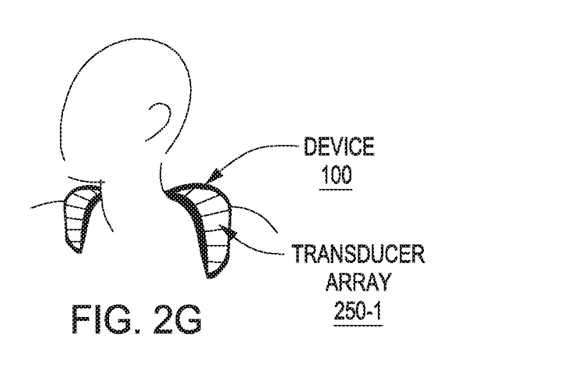
Figure 2H:
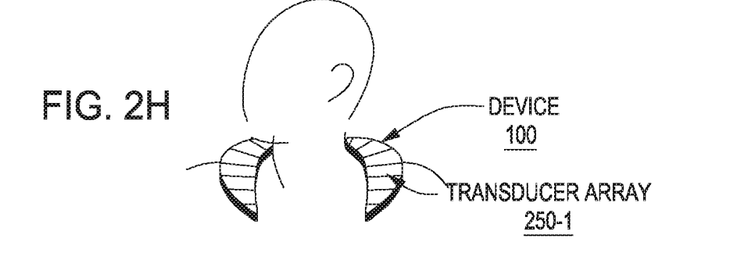

FIG. 2B illustrates device 100 of FIG. 1 in another form factor of a neck-worn device, according to various embodiments. As discussed above, the position of a transducer array 250 impacts the directionality of the haptic and/or audio output emitted from that transducer array 250. The haptic output of a transducer array 250 in the form factor illustrated in FIG. 2B may only point upwards. In one embodiment, the upward haptic output generates a tapping sensation on the user's head, including, for example and without limitation, on the user's temple, behind the ear, the cheeks, and the chin. Such haptic output may correspond to navigation instructions being delivered to the user or may direct the user's attention in a specific direction.

FIGS. 2C-2G illustrate device 100 of FIG. 1 in various other form factors of a wearable device, according to various embodiments. As discussed above, in each of the form factors illustrated in FIGS. 2C-2G, the position of a transducer array 250 impacts the directionality of the haptic and/or audio output emitted from that transducer array 250. In the form factors illustrated in FIGS. 2C, 2F, and 2G, device 100 is asymmetric such that the transducer arrays 250 on one side of device 100 vary in number relative to another side of device 100. In the form factor illustrated in FIG. 2F, device 100 is an epaulette attached to a shoulder of a user.

Figure 3:
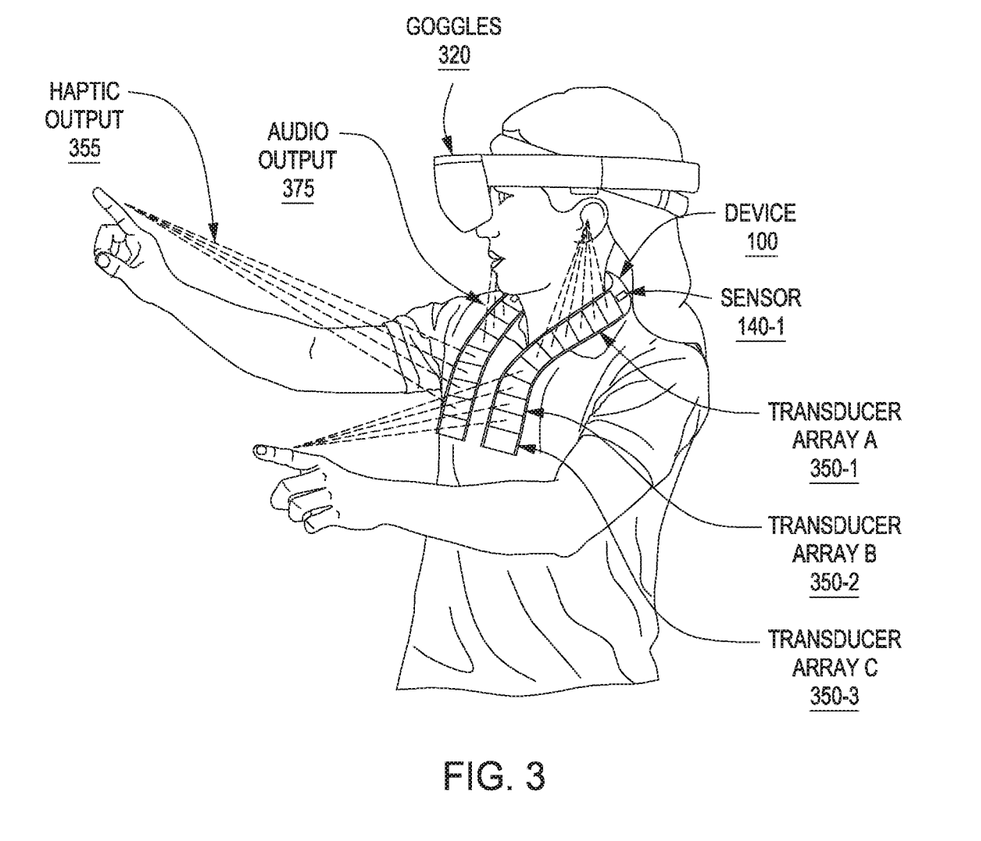
FIG. 3 illustrates the device of FIG. 1, in which each transducer array performs one or more of the sensing function, the haptic output function, and the audio output function, according to various embodiments.

FIG. 3 illustrates the device 100, in which each transducer array performs one or more of the sensing function, the haptic output function, and the audio output function, according to various embodiments. As shown, transducers 150 are arranged as transducer array A 350-1, transducer array B 350-2, and transducer array C 350-3. Device 100, as shown in FIG. 3, may be included in any of the form factors shown in FIGS. 2A-2H. Further, device 100 as shown in FIG. 3, may operate in conjunction with goggles 320 to provide one or more features associated with a VR, AR, or MR environment.

In some embodiments, transducers 150 operate in a dedicated mode. In particular, transducers 150 in transducer array A 350-1 generate audio output, transducers 150 in transducer array B 350-2 generate haptic output, and transducers 150 in transducer array C 350-3 performing sensing functions (e.g., generating pings and detecting ping echoes). Device 100 may also include one or more dedicated sensors 140 for object detection and tracking.

In another embodiment, transducers 150 may operate in a switching mode. Accordingly, each of transducer array A 350-1, transducer array B 350-2, and transducer array C 350-3 may switch between two or more of performing sensing, generating haptic output, and generating audio output. For example, and without limitation, during a first time interval, transducer array C 350-3 may generate a ping, while transducer array A 350-1 generates audio output and transducer array B 350-2 generate haptic output. During a second time interval, one or more of transducer array A 350-1, transducer array B 350-2, and transducer array C 350-3 may detect ping echoes. Additionally or alternatively, during the second time interval transducer array B 350-2 may generate audio output, while transducer array C 350-3 generates haptic output. Transducer array A 350-1 may continue to generate audio output and/or may detect reflected ping echoes.

In yet another embodiment, transducer application 132 may dynamically configure each transducer 150 to perform one or more of the sensing functionalities (e.g., generate pings, detect ping echoes), generating haptic output, and/or generating audio output. For example, transducer application 132 may dynamically select a first set of transducers 150 to perform sensing functions, a second set of transducers 150 to generate a haptic sensation, and a third set of transducers 150 to produce audio output. Transducer application 132 may perform the dynamic selection based on various parameters including the number of transducers 150 in device 100, the position and/or orientation of each of transducers 150, the output strength of each of transducers 150. Additionally, transducer application 132 may further perform dynamic selection based on the size, shape, location, and orientation of the haptic sensations for generation, and the location, volume, the frequency range, and the amplitude range of the audio signal for generation. For example, as shown, transducer application 132 may configure a first set of transducers 150 that are proximate to a user's shoulders to generate audio output to a user's ear, while a second set of transducers 150 that are located on a user's chest may generate a haptic sensation on a user's hand.

Figure 4:
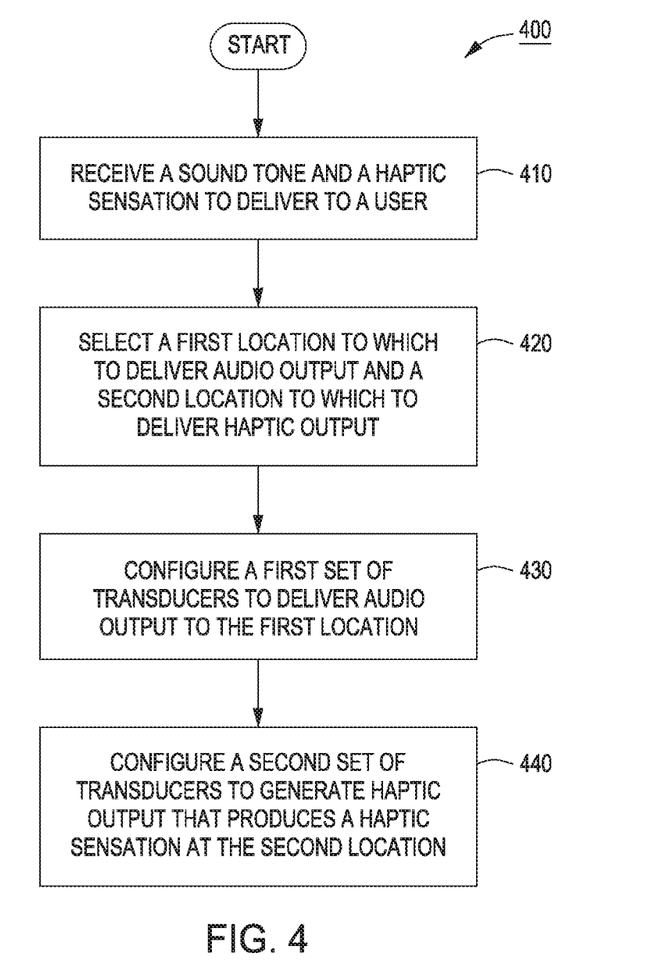
FIG. 4 is a flow diagram of method steps for providing audio content and haptic sensations to a user, according to various embodiments.

FIG. 4 is a flow diagram of method steps for providing audio content and haptic sensations to a user, according to various embodiments. Although the method steps are described in conjunction with the systems of FIGS. 1-3, persons skilled in the art will understand that any system configured to perform the method steps, in any order, falls within the scope of the present disclosure.

As shown, a method 400 begins at step 410, where transducer application 132 determines a sound tone and a haptic sensation to deliver to a user. Transducer application 132 may determine the sound tone and/or the haptic sensation based on detecting, via sensors 140, that a user performed a gesture. Transducer application 132 may access a look-up table stored in database 134 to determine that a sound tone to generate and/or a haptic sensation to generate. Additionally or alternatively, transducer application 132 may receive control signals from an external device, such as a mobile phone, a remote controller, and/or a computer. Transducer application 132 may select a sound tone and/or a haptic sensation based on the control signals.

At step 420, transducer application 132 selects a first location to which to deliver audio output and a second location to which to deliver haptic output. In various embodiments, transducer application 132 may configure transducers 150 to perform sensing functions to identify objects located around the device 100. In alternative embodiments, sensors 140 can be used instead of or in combination with transducers 150 to perform sensing functions to identify objects located around the device 100. Transducer application 132 may analyze the sensor data to identify a type of the object (e.g., a body part, a physical object, etc.). Once identified, transducer application 132 may further analyze the sensor data to localize the object and select whether to output audio output and/or haptic output to the object. In particular, transducer application 132 may select to output audio output to a first location and haptic output to a second location. The first location and the second location may correspond to a location of an object, a group of objects, and/or regions of space proximate to objects.

At step 430, transducer application 132 configures a first set of transducers 150 to deliver audio output to the first location. In various embodiments, transducers 150 may be arranged in a transducer array, such as transducer array A 350-1. In particular, transducer application 132 configures each of transducers 150 to generate ultrasonic waves that demodulate in space to produce audio output. The audio output is highly direction and providing a private audio to a user.

Further, at step 440, transducer application 132 configures a second set of transducers 150 to generate haptic output that produces a haptic sensation at the second location. In various embodiments, transducer application 132 may configure transducers 150 to generate a haptic sensation at various locations in space. The location of the haptic sensation may correspond to a location of an object being viewed in a VR/AR/MR environment. Additionally or alternatively, transducer application 132 may configure transducers 150 to generate haptic output that generates a haptic sensation on a user. Transducer application 132 may configure one or more transducers 150 to generate haptic output with a particular frequency, amplitude, and phase in order to control the size, shape, location, and movement pattern of the haptic sensation produced on the object. In some embodiments, the object may be a body part of a user. In some other embodiments, the object may be a body part of a person in proximity to the user.

In sum, the device delivers audio output and generates haptic sensations on or proximate to objects in the environment via which a user can perceive haptic sensations. The device includes transducer devices that operate in various modalities, including generating audio output, generating haptic output, and sensing objects in the environment. When generating audio output, the transducers produce ultrasonic waves that demodulate to produce audio output. The transducer application may configure the transducers to deliver the audio output to a specific location (e.g., a location of an ear of a user). When generating haptic output, the transducers output directional haptic output to various locations to the environment. The haptic output may produce a haptic sensation at each location. The haptic sensation may be sensed by a user in proximity to the various locations. Finally, when performing sensing, the transducers generate pings and detect ping echoes reflected off of objects in the environment. The transducer application may perform time-of-flight calculations to localize one or more objects in the environment based on the detected ping echoes. In various embodiments, the transducer application may dynamically configure each transducer to operate in one or more of the three functionalities and/or may preconfigure each transducer device to operation in one or more of the three functionalities.

At least one advantage of the disclosed techniques is that audio can be transmitted directly to the ears of a user, enabling the user to listen to audio content (e.g., music, voice conversations, notifications, etc.) without disturbing sound-sensitive objects around him or her. Additionally, because the device may be shoulder-mounted, the system does not isolate the user from sounds in his or her environment. Further, the device may interact with a user by generating haptic sensations on and/or proximate to the user. Accordingly, the device may generate haptic sensations that provide indicates to the user or people in proximity to the user (e.g., indicating the location of virtual objects in space).

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure has been described above with reference to specific embodiments. Persons of ordinary skill in the art, however, will understand that various modifications and changes may be made thereto without departing from the broader spirit and scope of the disclosure as set forth in the appended claims. For example, and without limitation, although many of the descriptions herein refer to specific types of highly-directional speakers, sensors, and audio events, persons skilled in the art will appreciate that the systems and techniques described herein are applicable to other types of highly-directional speakers, sensors, and audio events. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A system for providing audio content and haptic sensations to a user, the system comprising:
a first device comprising a plurality of transducers; and
a processor coupled to the plurality of transducers and configured to:
determine a sound tone and a haptic sensation to deliver to a user;

select a first location at which to deliver audio output corresponding to the sound tone and a second location to which to deliver haptic output corresponding to the haptic sensation;

configure a first set of transducers from the plurality of transducers to deliver the audio output to the first location; and configure a second set of transducers from the plurality of transducers to generate the haptic output for delivery to the second location, wherein the second location is at a position located away from the second set of transducers.

2. The system of claim 1, wherein the processor configures the first set of transducers to generate ultrasonic waves that demodulate to produce the audio output at the first location.

3. The system of claim 1, wherein the processor configures the second set of transducers to generate a haptic sensation at the second location by generating control signals that control an amplitude, a frequency, and a phase of individual haptic output generated by two or more transducers in the second set of transducers.

4. The system of claim 2, wherein the first device is a wearable device.

5. The system of claim 1, wherein the processor configures a third set of transducers from the plurality of transducers to detect a location of one or more objects located proximate to at least one of the first set of transducers or the second set of transducers.

6. The system of claim 5, wherein the processor configures the first set of transducers, the second set of transducers, and the third set of transducers to operate in at least one of a dedicated mode, a switching mode, or a dynamic selection mode.

7. The system of claim 6, wherein the processor configures the plurality of transducers to operate in the dedicated mode by configuring each of the first set of transducers to generate haptic output, each of the second set of transducers to generate audio output, and each of the third set of transducers to generate output for determining a location of at least one object.

8. The system of claim 6, wherein the processor configures the plurality of transducers to operate in the dynamic selection mode by selecting at least a first transducer to generate output for determining a location of at least one object, at least a second transducer to output haptic output, and at least a third transducer to generate audio output.

9. The system of claim 6, wherein the processor configures the plurality of transducers to operate in the switching mode by configuring each of the plurality of transducers to switch between at least two of object localization, generating haptic output, or generating audio output.

10. The system of claim 1, further comprising one or more sensors configured to detect one or more objects proximate to at least one of the first set of transducers or the second set of transducers.

11. A method for providing audio content and haptic sensations, the method comprising:

selecting a first location at which to deliver audio output and a second location to which to deliver haptic output;

configuring at least a first transducer from a plurality of transducers in a first device to deliver the audio output to the first location; and configuring at least a second transducer from the plurality of transducer in the first device to generate the haptic output for delivery to the second location, wherein the second location is at a position located away from the at least second transducer.

12. The method of claim 11, wherein the at least second transducer generates a haptic sensation at the first location and the at least first transducer generates ultrasonic waves that demodulate to produce audible sound.

13. The method of claim 11, further comprising:
acquiring sensor data; and
implementing a machine learning model to identify one or more features of a first object.

14. The method of claim 13, wherein one or more features of the first object include an ear and a hand, wherein the at least first transducer is configured to deliver the haptic output to the hand and the at least second transducer is configured to deliver the audio output to the ear.

15. The method of claim 11, further comprising:
receiving, from an external device, a sound tone to deliver to a first object;
receiving, from the external device, a haptic sensation to generate on the first object;
determining a first characteristic of the haptic output for generating the haptic sensation;
determining a second characteristic of the audio output for generating the sound tone;
generating control signals that encode the first characteristic and the second characteristic; and
outputting the control signals to the first transducer and the second transducer.

16. The method of claim 11, further comprising:
analyzing sensor data to detect a first gesture;
determining a characteristic of the haptic output based on the first gesture; and
generating a set of control signals based on the characteristic to configure the at least first transducer to generate a modified haptic output.

17. The method of claim 11, further comprising:
analyzing sensor data to detect a second gesture;
determining a characteristic of the audio output based on the second gesture; and
generating a set of control signals based on the characteristic to configure the at least second transducer to generate a modified audio output.

18. One or more non-transitory computer-readable storage media including instructions that, when executed by one or more processors, cause the one or more processors to provide audio content and haptic sensations to a user, by performing the steps of:

determining a sound tone and a haptic sensation to deliver to an object;

selecting a first location to which to deliver audio output corresponding to the sound tone and a second location to which to deliver haptic output corresponding to the haptic sensation;

configuring a first set of transducers from a plurality of transducers in a first device to deliver the audio output to the first location; and configuring a second set of transducers from the plurality of transducers in the first device to deliver the haptic output at the second location, wherein the second location is at a position located away from the second set of transducers.

19. The one or more non-transitory computer-readable storage media of claim 18, wherein selecting the first location and the second location comprises:

receiving sensor data indicating a location of the object; and identifying a first portion and a second portion of the object, wherein the first location corresponds to a location of the first portion and the second location corresponds to a location of the second portion.

20. The one or more non-transitory computer-readable storage media of claim 18, wherein the instructions further cause the one or more processors to perform the step of configuring a third set of transducers from the plurality of transducers in the first device to detect a location of one or more objects located proximate to at least one of the first set of transducers or the second set of transducers.

* * * * *